(12) United States Patent
Jin et al.

(10) Patent No.: US 11,139,540 B2
(45) Date of Patent: Oct. 5, 2021

(54) BATTERY MODULE AND BATTERY PACK

(71) Applicant: Contemporary Amperex Technology Co., Limited, Ningde (CN)

(72) Inventors: Haizu Jin, Ningde (CN); Dongyang Shi, Ningde (CN); Zhenhua Li, Ningde (CN); Xingdi Chen, Ningde (CN); Ning Chen, Ningde (CN); Fei Hu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 272 days.

(21) Appl. No.: 16/437,932

(22) Filed: Jun. 11, 2019

(65) Prior Publication Data

US 2020/0212412 A1 Jul. 2, 2020

(30) Foreign Application Priority Data

Dec. 29, 2018 (CN) .......................... 201811646277.6

(51) Int. Cl.
*H01M 50/54* (2021.01)
*H01M 50/20* (2021.01)
(Continued)

(52) U.S. Cl.
CPC ....... *H01M 50/54* (2021.01); *H01M 10/0431* (2013.01); *H01M 10/0481* (2013.01);
(Continued)

(58) Field of Classification Search
CPC .................................................... H01M 50/54
See application file for complete search history.

(56) References Cited

U.S. PATENT DOCUMENTS

| 2003/0059676 | A1* | 3/2003 | Ruiz Rodriguez | H01M 10/625 429/164 |
| 2012/0171553 | A1* | 7/2012 | Guen | H01M 4/70 429/159 |
| 2014/0349149 | A1* | 11/2014 | Kim | H01M 50/50 429/61 |

FOREIGN PATENT DOCUMENTS

| CN | 103094500 A | 5/2013 |
| CN | 105609882 A | 5/2016 |

(Continued)

OTHER PUBLICATIONS

The Extended European search report dated Jun. 30, 2020 for European application No. 19180572.0, 6 pages.
(Continued)

*Primary Examiner* — Brian R Ohara
(74) *Attorney, Agent, or Firm* — Law Offices of Liaoteng Wang

(57) ABSTRACT

The present disclosure relates to a battery module and a battery pack. The battery module comprises two or more secondary batteries arranged side by side in a first direction, each of which includes a case, an electrode assembly and a closing portion, wherein the case has a receiving hole comprising an opening and extending in a second direction, and the first direction intersects with the second direction, wherein the closing portion is sealingly connected with the case to close the opening, the electrode assembly is disposed in the receiving hole and includes two or more electrode units, the electrode unit includes a first electrode plate, a second electrode plate and a separator, and the two or more electrode units are stacked in the second direction.

15 Claims, 7 Drawing Sheets

(51) Int. Cl.
*H01M 50/147* (2021.01)
*H01M 10/04* (2006.01)
*H01M 10/0587* (2010.01)

(52) U.S. Cl.
CPC ..... *H01M 10/0587* (2013.01); *H01M 50/147* (2021.01); *H01M 50/20* (2021.01); *H01M 2220/20* (2013.01)

(56) References Cited

FOREIGN PATENT DOCUMENTS

| | | |
|---|---|---|
| CN | 105957991 A | 9/2016 |
| CN | 206490120 U | 9/2017 |
| CN | 107919443 A | 4/2018 |
| CN | 207183466 U | 4/2018 |
| CN | 108198989 A | 6/2018 |
| CN | 209217068 U | 8/2019 |
| CN | 209217103 U | 8/2019 |
| CN | 209217104 U | 8/2019 |
| CN | 209232866 U | 8/2019 |
| CN | 209298235 U | 8/2019 |
| CN | 209571433 U | 11/2019 |
| DE | 102011078984 A1 | 1/2013 |
| KR | 20170050875 A | 5/2017 |
| KR | 101776898 B1 | 9/2017 |
| WO | 2016088535 A1 | 6/2016 |
| WO | 2017190907 A1 | 11/2017 |

OTHER PUBLICATIONS

PCT International Search Report for PCT/CN2019/119941, dated Feb. 3, 2020, 10 pages.

* cited by examiner

BATTERY MODULE AND BATTERY PACK

CROSS REFERENCE TO RELATED APPLICATION

This application claims priority to Chinese Patent Application No. 201811646277.6, filed on Dec. 2, 2018, which is hereby incorporated by reference in its entirety.

TECHNICAL FIELD

The present disclosure relates to a technical filed of battery, and particularly relates to a battery module and a battery pack.

BACKGROUND

With the development of technology, applications of secondary batteries are becoming more and more extensive, involving production or life. The secondary battery is also called as a power battery and is a rechargeable battery. The secondary battery are used widely. The secondary batteries with a low capacity can be used for a small electric vehicle, while the secondary batteries with a high capacity can be used for a large electric vehicle such as a hybrid vehicle or an electric vehicle. In the case that the secondary batteries are used in a group, a busbar is necessary to connect the respective secondary batteries in series or in parallel. In general, the busbar is welded to positive electrodes and negative electrodes of the sedentary batteries. A battery module includes a plurality of secondary batteries and connecting members for fixing the plurality of secondary batteries.

A secondary battery mainly includes a case, an electrode assembly and a cap assembly, wherein the electrode assembly is formed by winding or stacking a positive electrode plate, a negative electrode plate and a separator. During charging and discharging, the electrode assembly included in the secondary battery may expand, and thus release a large expansion force to outside.

Since the plurality of secondary batteries included in the battery module are arranged side by side in one direction and the expansion force released by the electrode assembly is in the arrangement direction of the secondary batteries, a large combined force will be formed by the superposition of the expansion forces released by the electrode assemblies included in the plurality of secondary batteries. This not only will cause deterioration of electrical performance of the secondary battery, but also requires the connecting members to have a high structural strength to restrain and offset the expansion force, which generally is achieved by increasing a volume of the connecting member, and in turn will reduce energy density and space utilization of the secondary battery.

SUMMARY

The embodiments of the present disclosure provide a battery module and a battery pack. The battery module has a small expansion amount in an arrangement direction of secondary batteries, and thus can effectively improve safety during use.

On one aspect, the embodiments of the present disclosure provide a battery module, comprising: two or more secondary batteries arranged side by side in a first direction, each of which includes a case, an electrode assembly and a closing portion, wherein the case has a receiving hole comprising an opening and extending in a second direction, and the first direction intersects with the second direction, wherein the closing portion is sealingly connected with the case to close the opening, the electrode assembly is disposed in the receiving hole and includes two or more electrode units, the electrode unit includes a first electrode plate, a second electrode plate and a separator, and the two or more electrode units are stacked in the second direction.

According to one aspect of the embodiments of the present disclosure, the electrode unit includes a wide side and a narrow side, wherein the wide side is disposed opposite to the closing portion, the narrow side is located on one end of the wide side in the first direction, and the wide side has an area larger than that of the narrow side.

According to one aspect of the embodiments of the present disclosure, a ratio of the area of the narrow side to that of the wide side is in a range of $1/10$~$1/2$.

According to one aspect of the embodiments of the present disclosure, the electrode unit is formed by winding the first electrode plate, the second electrode plate and the separator, and the electrode unit is formed into a flat shape and has two wide sides and two narrow sides, wherein the two narrow sides are connected to two opposite ends of the wide side in the first direction, respectively.

According to one aspect of the embodiments of the present disclosure, the first electrode plates in adjacent two layers have a first gap corresponding to the narrow side, and the first gap has a dimension of 5 µm to 50 µm.

According to one aspect of the embodiments of the present disclosure, the first electrode plates in adjacent two layers have a first gap corresponding to the narrow side and a second gap corresponding to the wide side, wherein the first gap has a dimension greater than that of the second gap.

According to one aspect of the embodiments of the present disclosure, the case is made of a material of metal, and includes a first side wall, a second side wall and a bottom wall connected to the first side wall and the second side wall, wherein the first side wall has a larger area than the second side wall and the bottom wall, adjacent two secondary batteries are disposed with the first side walls opposite to each other, and the narrow side of the electrode unit is disposed corresponding to the first side wall.

According to one aspect of the embodiments of the present disclosure, a third gap is provided between the narrow side and the first side wall, and the third gap has a dimension of 0.3 mm to 0.9 mm.

According to one aspect of the embodiments of the present disclosure, the first side wall and the second side wall each has a thickness less than that of the bottom wall.

According to one aspect of the embodiments of the present disclosure, the closing portion includes a cap plate and electrode terminals, all of which are located at one side of the electrode assembly in the second direction, wherein the cap plate is connected to the case, and the electrode terminals are disposed on the cap plate and electrically connected to the electrode assembly.

According to one aspect of the embodiments of the present disclosure, the battery module further comprises a first end plate and a second end plate spaced apart from each other in the first direction, wherein the two or more secondary batteries are disposed between the first end plate and the second end plate, and the first end plate and the second end plate each has a Young's modulus less than 30 Gpa.

The battery module according to the embodiments of the present disclosure includes two or more secondary batteries arranged side by side in the first direction. The electrode units included in the respective secondary batteries are stacked in the receiving hole of the case in the second direction. When the electrode unit of the present embodiment expands, it mainly expands and deforms in the second direction, while with a small expansion amount in the first direction. Thus, the combined expansion force in the first direction accumulated by the respective secondary batteries is small. In the first direction, the battery module does not need a structural member with high strength to restrain and offset the expansion force, or merely needs a structural member with low strength to restrain and offset the expansion force, which can effectively reduce a mass of the entire battery module, make the battery module to be more compact and effectively increase energy density of the battery module. Meanwhile, since the battery module has a small expansion amount in the first direction, safety of the battery module during use can be effectively improved.

On a further aspect, the embodiments of the present disclosure provides a battery pack, comprises a housing having a receiving chamber; and the battery module according to the above embodiments, wherein the battery module is accommodated in the receiving chamber.

According to a further aspect of the embodiments of the present disclosure, in the second direction, the housing has a first height greater than a second height of the secondary battery and less than twice of the second height of the secondary battery.

According to a further aspect of the embodiments of the present disclosure, the battery pack comprises two to six battery modules arranged in a width direction of the housing, and each of the battery modules comprises 20 to 32 secondary batteries.

According to a further aspect of the embodiments of the present disclosure, the secondary battery has a thickness of 50 mm or more, and the secondary battery has a height of 80 mm or more.

According to a further aspect of the embodiments of the present disclosure, the electrode unit includes a wide side and a narrow side, wherein the wide side is disposed opposite to the closing portion, the narrow side is located on one end of the wide side in the first direction, and the wide side has an area larger than that of the narrow side.

According to a further aspect of the embodiments of the present disclosure, the electrode unit is formed by winding the first electrode plate, the second electrode plate and the separator, and the electrode unit is formed into a flat shape and has two wide sides and two narrow sides, wherein the two narrow sides are connected to two opposite ends of the wide side in the first direction, respectively.

According to a further aspect of the embodiments of the present disclosure, the first electrode plates in adjacent two layers have a first gap corresponding to the narrow side and a second gap corresponding to the wide side, wherein the first gap has a dimension greater than that of the second gap.

According to a further aspect of the embodiments of the present disclosure, the case is made of a material of metal, and includes a first side wall, a second side wall and a bottom wall connected to the first side wall and the second side wall, wherein the first side wall has a larger area than the second side wall and the bottom wall, adjacent two secondary batteries are disposed with the first side walls opposite to each other, and the narrow side of the electrode unit is disposed corresponding to the first side wall.

BRIEF DESCRIPTION OF THE DRAWINGS

Features, advantages, and technical effects of exemplary embodiments of the present disclosure will be described below with reference to accompanying drawings.

Figure 1:
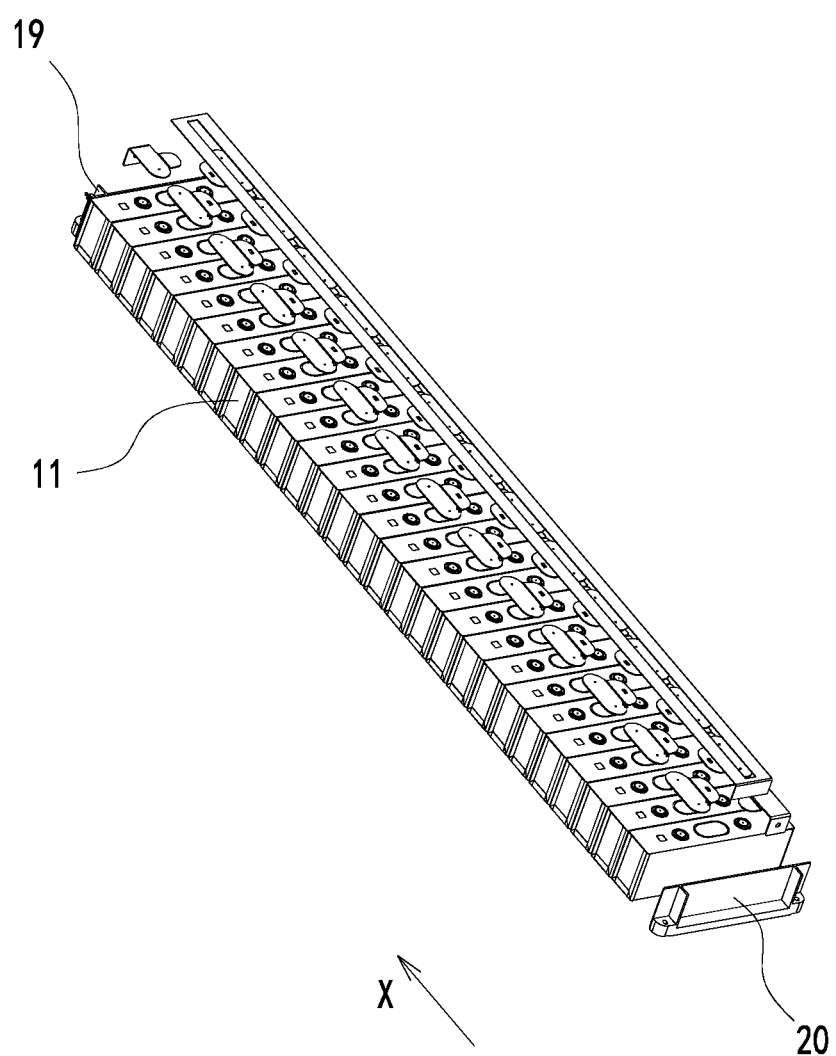
FIG. 1 is a schematic diagram showing a configuration of a battery module according to an embodiment of the present disclosure.

In the above drawings, the drawings are not drawn to scale.

REFERENCE NUMERALS 10, battery module;
11, secondary battery;
12, case; 12a, receiving hole; 121, first side wall; 122, second side wall; 123, bottom wall;
13, electrode assembly;
14, electrode unit; 14a, wide side; 14b, narrow side; 141, first electrode plate; 142, second electrode plate; 143, separator;
15, cap assembly; 151, cap plate; 152, electrode terminal;
16, first gap;
17, second gap;
18, third gap;
19, first end plate;
20, second end plate;
30, battery module;
31, housing; 31a, receiving chamber; 311, upper cover; 312, lower case;
X, first direction; Y, second direction.

DETAILED DESCRIPTION

Below, embodiments of the present disclosure will be further described in detail with reference to the drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", "third", "fourth" and the like are used for descriptive purposes only and are not to be construed as indicating or implying relative importance.

In the description of the present disclosure, it should be noted that, unless otherwise stated, the terms "installation", "connected, and "coupled" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding the present disclosure, a battery module 10 according to the embodiments of the present disclosure will be described in detail below by reference to FIG. 1 to FIG. 7.

As shown in FIG. 1, the embodiments of the present disclosure provide a battery module 10, comprising two or more secondary batteries 11 according to the present embodiment and busbars, each of which is used for connecting two secondary batteries 11. The two or more secondary batteries 11 are arranged side by side in a first direction X, wherein the first direction X is an arrangement direction of the two or more secondary batteries 11. One end of the busbar is fixedly connected to one of the two secondary batteries 11, and the other end of the busbar is fixedly connected to the other one of the two secondary batteries 11. In one embodiment, the secondary battery 11 may be a battery of hard case or soft package.

Figure 2:
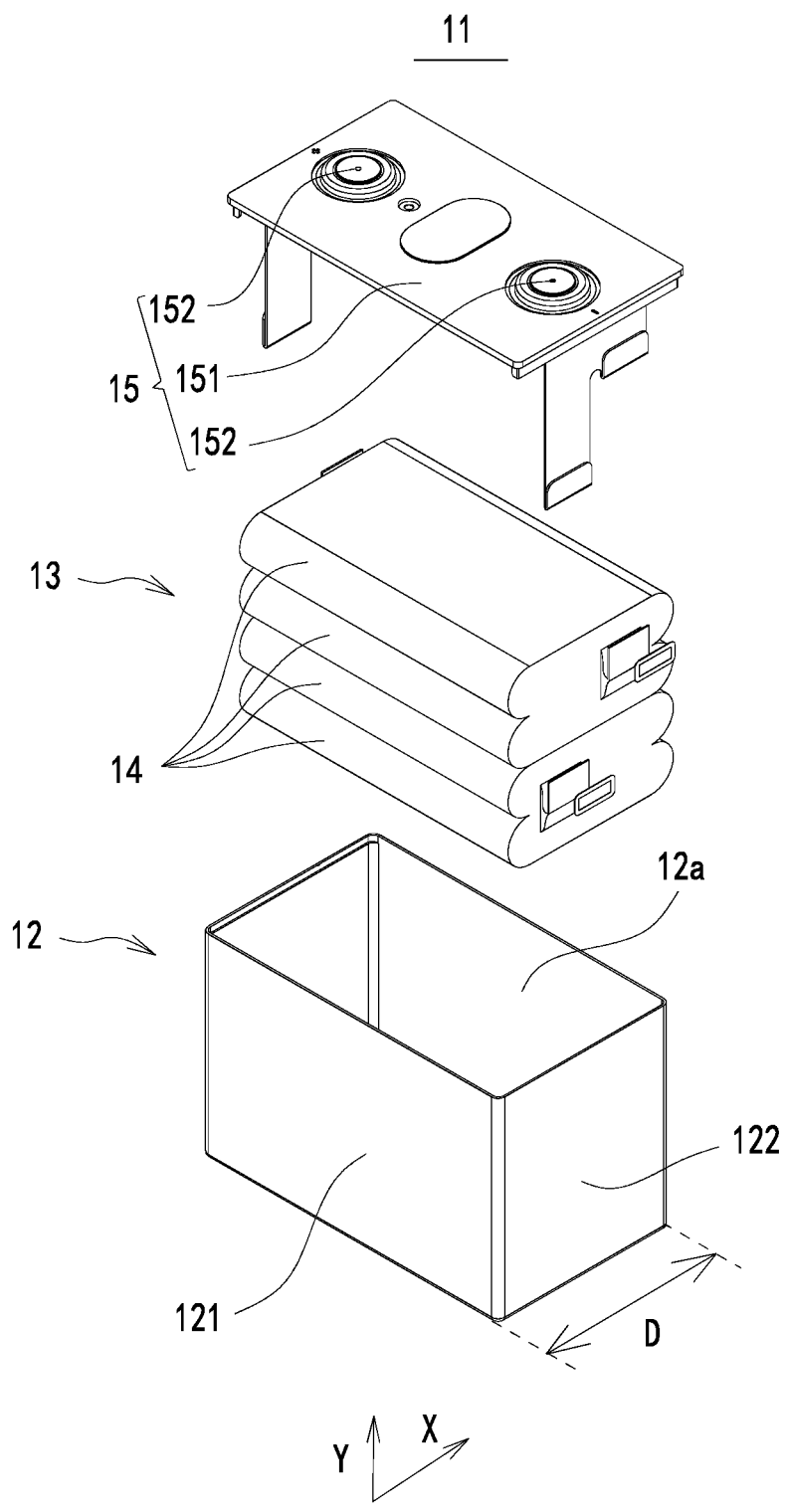
FIG. 2 is a schematic exploded diagram showing a configuration of a secondary battery according to an embodiment of the present disclosure.

Referring to FIG. 2, the secondary battery 11 according to an embodiment of the present disclosure includes a case 12, an electrode assembly 13 disposed in the case 12, and a closing portion sealingly connected with the case 12.

The case 12 of the present embodiment may be formed in a shape of a quadrangular prism or other shapes. The case 12 has an internal space for accommodating the electrode assembly 13 and an electrolyte therein. The case 12 can be made of a material such as aluminum, aluminum alloy and plastic.

Figure 3:
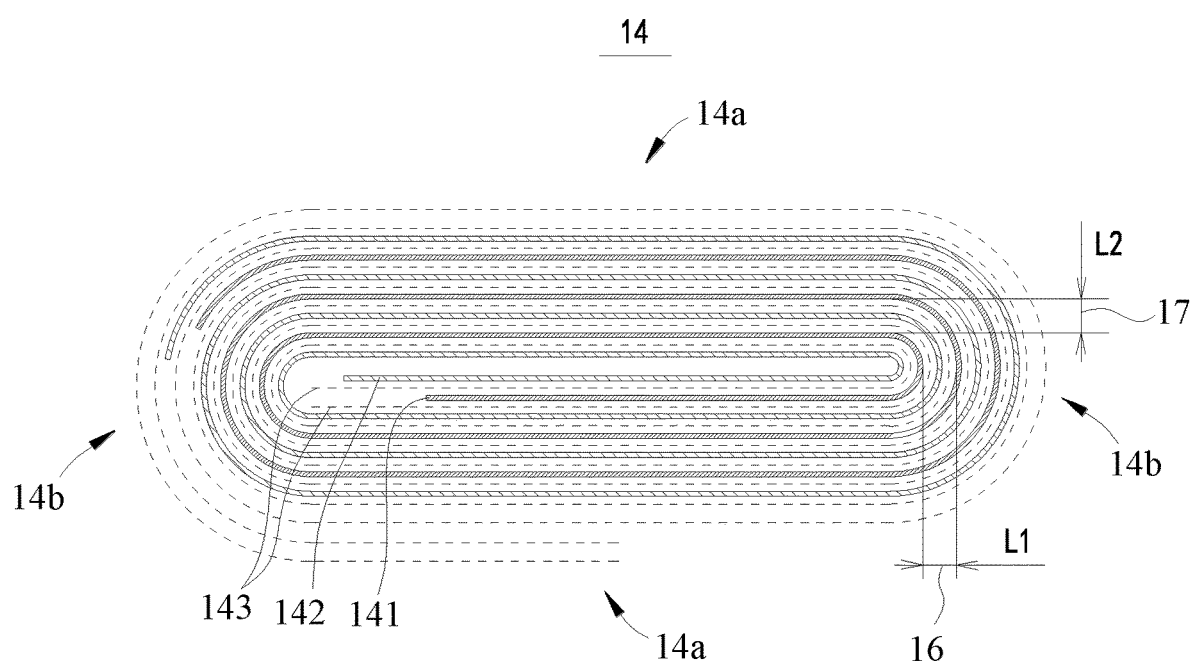
FIG. 3 is a schematic diagram showing a configuration of an electrode unit according to an embodiment of the present disclosure.

Referring to FIG. 3, the electrode assembly 13 of the present embodiment includes two or more electrode units 14. The electrode unit 14 of the present embodiment can be formed by stacking or winding a first electrode plate 141, a second electrode plate 142 and a separator 143, and be formed to have a body portion and a tab connected with the body portion. The separator 143 is an insulator interposed between the first electrode plate 141 and the second electrode plate 142. The electrode unit 14 of the present embodiment is formed by winding the separator 143, the first electrode plate 141 and the second electrode plate 142, and is formed into a flat shape comprising multiple loops. In the present embodiment, the description is made by exemplarily taking the first electrode plate 141 as a positive electrode plate and taking the second electrode plate 142 as a negative electrode plate. In other embodiments, the first electrode plate 141 may be a negative electrode plate while the second electrode plate 142 is a positive electrode plate. Further, a positive active material is coated on a coating region of the positive electrode plate while a negative active material is coated on a coating region of the negative electrode plate. A plurality of uncoated regions extending from the body portion serve as the tab. The electrode unit 14 includes two tabs, a positive tab and a negative tab, wherein the positive tab is formed by stacking the plurality of uncoated regions extending from the coated region of the positive electrode plate, and the negative tab is formed by stacking the plurality of uncoated regions extending from the coated region of the negative electrode plate. During infiltration of the electrolyte in the production or later use of the secondary battery 11, the active material layer included in the electrode unit 14 of the present embodiment will expand, thereby causing the entire electrode unit 14 to expand. Alternatively, the electrode unit of the present embodiment has a capacity of 50 Ah to 300 Ah.

The closing portion of the present disclosure may be an aluminum plastic film formed of aluminum alloy, plastic, nylon, or the like, or may be a cap assembly 15 made of a material such as metal. The closing portion of the present embodiment is the cap assembly 15, which includes a cap plate 151 and electrode terminals 152. All of the cap plate 151 and the electrode terminals 152 are located on one side of the electrode assembly 13 in a second direction Y. The cap assembly 15 is sealingly connected to the case 12 by the cap plate 151. The electrode terminals 152 are disposed on the cap plate 151 and are electrically connected to the electrode assembly 13.

The battery module of the present embodiment includes two or more secondary batteries 11. The two or more secondary batteries 11 are arranged side by side in the first direction X. The secondary battery 11 includes the case 12 with the receiving hole 12a, and the electrode assembly 13 disposed in the receiving hole 12a, wherein the receiving hole 12a has the opening and extends in the second direction Y, that is, the second direction Y is parallel to an extending direction of the receiving hole 12a. The electrode assembly 13 includes two or more electrode units 14, which are stacked in the second direction Y, wherein the second direction Y is parallel to the stacking direction of the two or more electrode units 14. In the present embodiment, the second direction Y is perpendicular to the first direction X, and also is perpendicular to an extending direction of the opening of the receiving hole 12a and that of the closing portion. It can be easily understood that, in the present embodiment, the second direction Y may intersect with and be approximately perpendicular to the first direction X, and the second direction Y may intersect with and be approximately perpendicular to the extending direction of the opening of the receiving hole 12a and that of the closing portion. If the electrode unit 14 of the present embodiment expands, the electrode assembly 13 may generate a first expansion force in the first direction X and a second expansion force in the second direction Y. Since the plurality of the electrode units 14 are stacked, the first expansion force is smaller than the second expansion force. Therefore, the electrode assembly 13 will expand primarily in the second direction Y, and the primary expansion force of the electrode assembly 13 is in the second direction Y. In contrast, in the first direction X, the first expansion force of the electrode assembly 13 is small, and thus has a little affection on the case 12. In the case that the two or more secondary batteries 11 of the present embodiment are arranged side by side in the first direction X, since the second expansion force generated by each secondary battery 11 due to the expansion thereof has a direction intersecting with the first direction X, that is, the second expansion force generated by each secondary battery 11 due to the expansion thereof is in the second direction Y, a large combined force will not be formed by superposition of the second expansion forces generated by the respective secondary batteries 11 in the first direction X. As such, when fixing the battery module 10 including two or more secondary batteries 11 of the present embodiment by using an external fixing member in the first direction X, requirements on rigidity and strength of the fixing member can be lowered, which is beneficial to reduce a volume or weight of the fixing member, and further increase an energy density and space utilization of the secondary battery 11 and the entire battery module 10, and also is beneficial to improve cycle performance of the secondary battery.

In the present embodiment, the electrode unit 14 includes a wide side 14a and a narrow side 14b. The wide side 14a is disposed opposite to the closing portion, which is not limited to the situation that the wide side 14a and a surface of the closing portion towards the wide side 14a are completely opposite to each other in a strict sense, and also includes the situation that the both are opposite to each other partially, and the situation that the both are opposite to each other with the wide side 14a being arched due to expansion and the surface of the closing portion towards the wide side 14a being flat. The narrow side 14b is located on one end of the wide side 14a in the first direction X, where the wide side 14a has two opposite ends in the first direction X, and one narrow side 14b is connected to one end of the wide side 14a. The wide side 14a has an area larger than that of the narrow side 14b. Thus, the expansion force generated by the wide side 14a is larger than that generated by the narrow side 14b, which can further reduce the expansion force of the secondary battery 11 in the first direction X. Preferably, a ratio of the area of the narrow side 14b to the area of the wide side 14a is in a range of $1/10 \sim 1/2$. If the ratio is greater than $1/2$, the area of the narrow side 14b is too large, resulting in that the combined force of the first expansion forces is too large; if the ratio is less than $1/10$, the area of the wide side 14a is too large in the case where the capacity of the secondary battery 11 is constant, which leads to difficulties in the infiltration of the electrolyte.

The electrode unit 14 of the present embodiment is preferably formed by winding the first electrode plate 141, a second electrode plate 142 and a separator 143. The electrode unit 14 of the present embodiment is formed into a flat shape. The electrode unit 14 includes two winding end faces opposite to each other and a winding axis perpendicular to the winding end faces. Referring to FIG. 3, the electrode unit 14 includes a wide side 14a and a narrow side 14b, wherein the narrow side 14b at least partially includes an arc region, and there are two wide sides 14a and two narrow sides 14b. The two wide sides 14a are disposed opposite to each other in the second direction Y, and each extends perpendicular to the second direction Y; and the two narrow sides 14b are disposed opposite to each other in the first direction X and are respectively connected to two opposite ends of each wide side 14a in the first direction. The wide sides 14a and the narrow sides 14b are alternately arranged around the winding axis of the electrode unit 14. Adjacent two electrode units 14 are disposed with their respective wide sides 14a being contact with each other. When the electrode unit 14 of the present embodiment expands, both the wide side 14a and the narrow side 14b expand. The wide side 14a expand in the second direction Y, and has a larger expansion amount than the narrow side 14b. In one example, the wide side 14a is in a flat shape while the narrow side 14b is in an arc shape.

Referring to FIG. 3, the electrode unit 14 formed by winding in the present embodiment has multiple layers of the first electrode plates 141 in a radial direction. The first electrode plates 141 in adjacent two layers have a first gap 16 corresponding to the narrow side 14b, and have a second gap 17 corresponding to the wide side 14a. Here, both a dimension L1 of the first gap 16 and a dimension L2 of the second gap 17 refer to a sum of gaps between the separator 143 and the first electrode plate 141 and gaps between the separator 143 and the second electrode plate 142. When the active material coated on the first electrode plate 141 or the second electrode plate 142 of the electrode unit 14 expands, each layer of the first electrode plates 141 will displace in the radial direction of the electrode unit 14 due to the expansion force. Both of the first gap 16 and the second gap 17 can absorb the displacement of each layer of the first electrode plates 141, which can effectively reduce an amount of expansion displacement of the narrow side 14b and the wide side 14a of the electrode unit 14, thereby effectively reducing the expansion force released by the entire electrode unit 14 in various directions. In one embodiment, the dimension L1 of the first gap 16 is greater than the dimension L2 of the second gap 17, so that the first gap 16 can absorb more expansion displacement of the first electrode plate 141 than the second gap 17. As a result, the narrow side 14b of the electrode unit 14 has a smaller amount of expansion displacement than the wide side 14a of the electrode unit 14, and thus can reduce the accumulation of the expansion force in the first direction X to a greater extent. In one embodiment, the first gap 16 and the second gap 17 are defined by gaps between the same two layers of the first electrode plates 141. In one embodiment, the first gap 16 has the dimension L1 of 5 µm to 50 µm. If the dimension L1 of the first gap 16 is less than 5 µm, the narrow side 14b of the electrode unit 14 will contact the case 12 earlier when the electrode unit 14 expands, resulting in that the electrode unit 14 will receive a larger reaction force when it continues to expand after the narrow side 14b has contacted the case 12. This will further cause the electrolyte in the first gap 16 to be squeezed out, thereby causing that the lithium ion cannot be normally transferred, which adversely affects service life of the secondary battery 11. Meanwhile, since the narrow side 14b of the electrode unit 14 is restrained by the case 12, the expansion force will be transferred to the wide side 14a, thereby causing the expansion force to be accumulated too much in the second direction Y. If the dimension L1 of the first gap 16 is greater than 50 µm, the first gap 16 between the adjacent two layers of the first electrode plates 141 is too large, thereby causing that a transfer time of the lithium ion is too long, which will thus lead to a poor dynamic performance on the narrow side 14b and easy occurrence of lithium plating.

Figure 4:
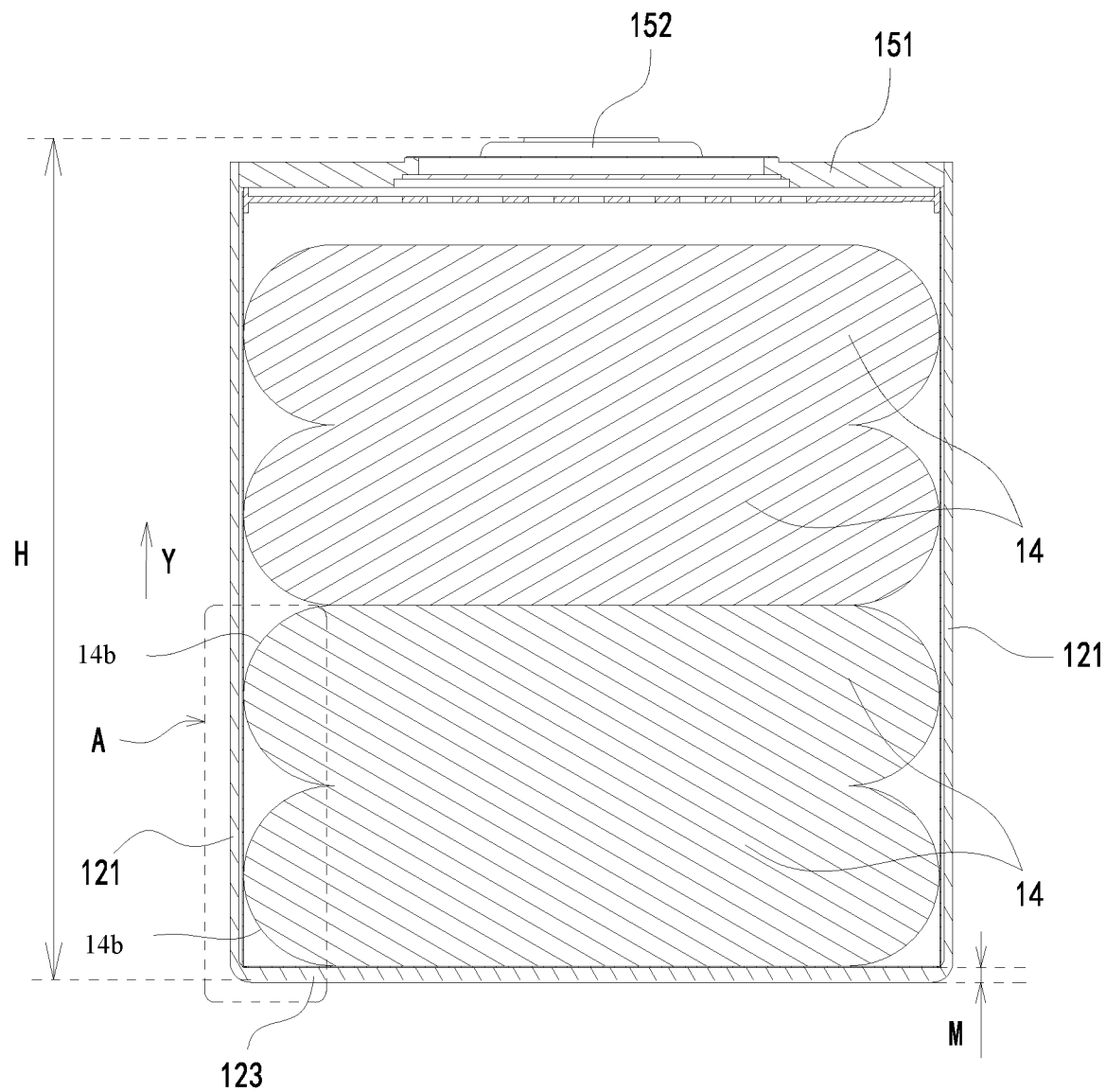
FIG. 4 is a cross-sectional view showing a configuration of a secondary battery according to an embodiment of the present disclosure.
Figure 5:
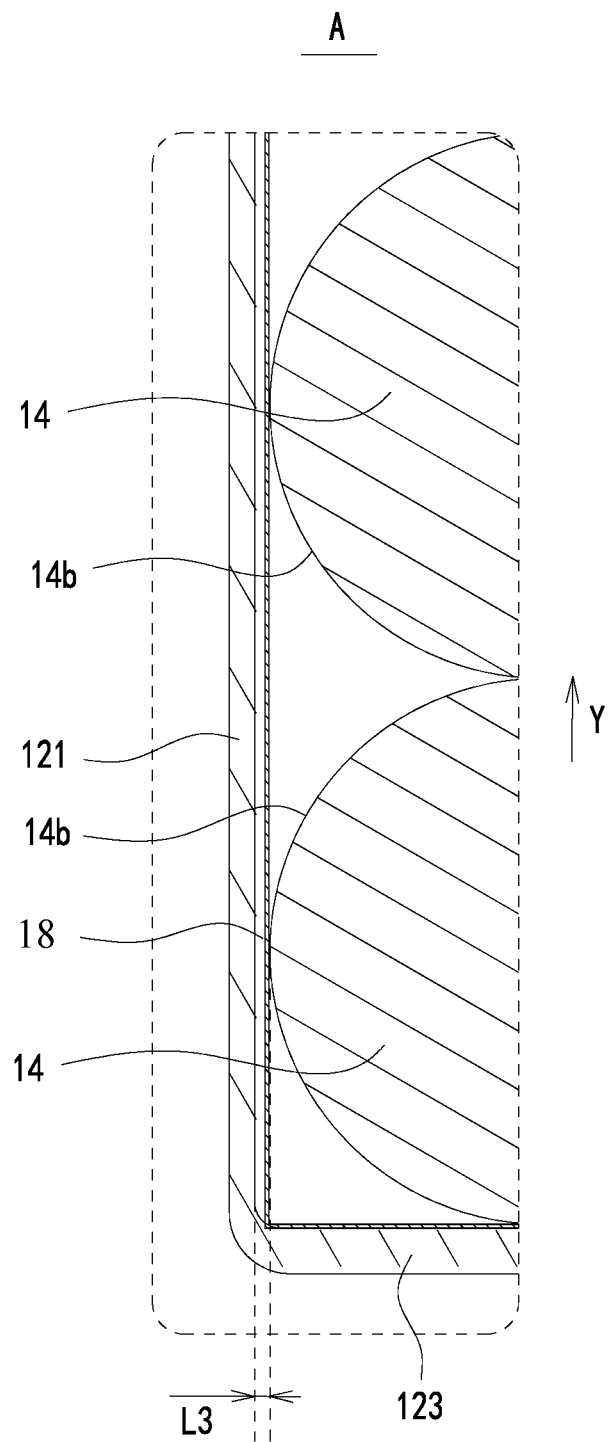
FIG. 5 is an enlarged view of a portion A in FIG. 4.

The case 12 according to the present embodiment is preferably made of a material of metal. Referring to FIG. 2, the case 12 includes a first side wall 121, a second side wall 122 and a bottom wall 123 connected to the first side wall 121 and the second side wall 122. The cap assembly 15 is disposed opposite to the bottom wall 123 in the second direction Y. The cap assembly 15 is sealingly connected to the first side wall 121 and the second side wall 122. The first side wall 121 has an area larger than that of the second side wall 122, and also larger than that of the bottom wall 123. Adjacent two secondary batteries 11 are disposed with the first side walls 121 opposite to each other. Referring to FIG. 4 or FIG. 5, the narrow side 14b is disposed corresponding to the first side wall 121. In some particular cases, the narrow side 14b of the electrode unit 14 may also expand, but with a small expansion amount, and thus, a compressive force exerted on the first side wall 121 by the narrow side 14b is small. Therefore, a combined force of the expansion forces from the respective secondary batteries 11 in the first direction X is small. Further, since the first side wall 121 has a larger area, the deformation of the first side wall 121 can be reduced. Meanwhile, the larger the expansion amount of the electrode unit 14, the less the dimension L1 of the first gap 16 and the dimension L2 of the second gap 17. During use, the electrode unit 14 consumes its internal electrolyte, and thus it is necessary to continuously replenish the electrolyte from the outside. When the electrode unit 14 expands, the first side wall 121 will restrain the narrow side 14b, causing the first gap 16 to become smaller. This will cause that the electrolyte in the case 12 is difficult to be replenished to an interior of the electrode unit 14 through the first gap 16, thereby adversely affecting the electrical performance of the electrode unit 14. Moreover, when the electrode unit 14 expands, the first electrode plate 141 or the second electrode plate 142 located at the outermost layer will be subjected to a relatively large tensile stress, and thus is easy to be broken. The first side wall 121 of the present embodiment can restrain the narrow side 14b and prevent a too much expansion of the narrow side 14b, thereby effectively reducing a possibility of breakage of the first electrode plate 141 or the second electrode plate 142. In one embodiment, there are two first side walls 121 and two second side walls 122. The first side walls 121 and the second side walls 122 are alternately arranged, forming a cylindrical member with a rectangular cross section. The bottom wall 123 is formed into a plate of a rectangular shape, and is sealingly connected with the first side wall 121 and the second side wall 122.

In one embodiment, referring to FIG. 5, a third gap 18 is provided between the narrow side 14b and the first side wall 121. The third gap 18 has a dimension L3 of 0.3 mm to 0.9 mm. If the dimension L3 of the third gap is less than 0.3 mm, the narrow side 14b of the electrode unit 14 will completely invade the third gap 18, contact and exert a compressive force on the first side wall 121, even when the narrow side 14b expands to a small extent. This will cause that a too large compressive force is exerted on the first side wall 121 by the electrode unit 14 when the narrow side 14b of the electrode unit 14 reaches maximum expansion amount, thereby causing deformation of the first side wall 121 or even deformation of the entire battery module 10 in the first direction X. If the dimension L3 of the third gap 18 is greater than 0.9 mm, the narrow side 14b of the electrode unit 14 cannot completely invade the third gap 18 and contact the first side wall 121 until it expands to a relatively great extent, thereby causing that the first side wall 121 cannot effectively restrain the electrode unit 14. This will further cause a too much expansion of the narrow side 14b of the electrode unit 14, thereby causing the first electrode plate 141 or the second electrode plate 142 at the outermost layer to be broken.

In one embodiment, each of the first side wall 121 and the second side wall 122 has a thickness less than a thickness M of the bottom wall 123. Since the main expansion direction of the electrode unit 14 of the present embodiment is in the second direction Y, the electrode unit 14 exerts a larger force on the bottom wall 123 than the first side wall 121 and the second side wall 122 when the electrode unit 14 expands. Increasing the thickness M of the bottom wall 123 can enhance a strength of the bottom wall 123, increase the constraint on the electrode unit 14, and improve deformation resistance of the bottom wall 123. In the embodiment in which the wide side 14a of the electrode unit 14 faces the bottom wall 123, the bottom wall 123 can restrain the expansion of the electrode unit 14, so that the electrode unit 14 cannot expand too much. As a result, the first gap 16 will not be completely invaded and disappear, thereby ensuring sufficient electrolyte in the first gap 16. Further, reducing the thickness of the first side wall 121 and that of the second side wall 122 is beneficial to reduce a weight of the entire secondary battery 11 and thereby conducive to improving the energy density of the secondary battery 11 and the battery module 10.

Referring to FIG. 1, the battery module 10 of the present embodiment further includes a first end plate 19 and a second end plate 20, which are spaced apart from each other in the first direction X. Two or more secondary batteries 11 are disposed between the first end plate 19 and the second end plate 20. The first end plate 19 and the second end plate 20 each has a Young's modulus less than 30 GPa. Since the expansion force of each secondary battery 11 included in the battery module 10 of the present embodiment is small in the first direction X, the first end plate 19 and the second end plate 20 each can have a smaller thickness in the first direction X, and the rigidity and strength requirements on the first end plate 19 and the second plate 20 also can be lowered, which is beneficial to reduce weights of the first end plate 19 and the second end plate 20, and also is beneficial to improve the energy density of the secondary battery 11 and the battery module 10. Moreover, limits on materials of the first end plate 19 and the second end plate 20 also can be reduced, and the materials of the first end plate 19 and the second end plate 20 can be selected from a wider range, which can reduce manufacturing difficulties and costs. In one embodiment, the battery module 10 further includes a connecting member that is connected to both of the first end plate 19 and the second end plate 20. The connecting member can fasten the first end plate 19 and the second end plate 20, thereby fastening the respective secondary batteries 11, and improving positional stability of the respective secondary batteries 11.

The battery module 10 according to the embodiments of the present disclosure includes two or more secondary batteries 11 arranged side by side in the first direction X. The electrode units 14 included in the respective secondary batteries 11 are stacked in the second direction Y. When the electrode unit 14 of the present embodiment expands, it mainly expands and deforms in the second direction Y, while with a small expansion amount in the first direction X. Thus, the combined expansion force in the first direction X of the expansion forces of the respective secondary batteries 11 is small. In the first direction X, the battery module 10 does not need a structural member with high strength to restrain and offset the expansion force, or merely needs a structural member with low strength to restrain and offset the expansion force, which can effectively reduce a mass of the entire the battery module 10, make the battery module 10 to be more compact and effectively increase the energy density of the battery module 10. Meanwhile, since the battery module 10 has a small expansion amount in the first direction X, safety of the battery module during use can be effectively improved.

Figure 6:
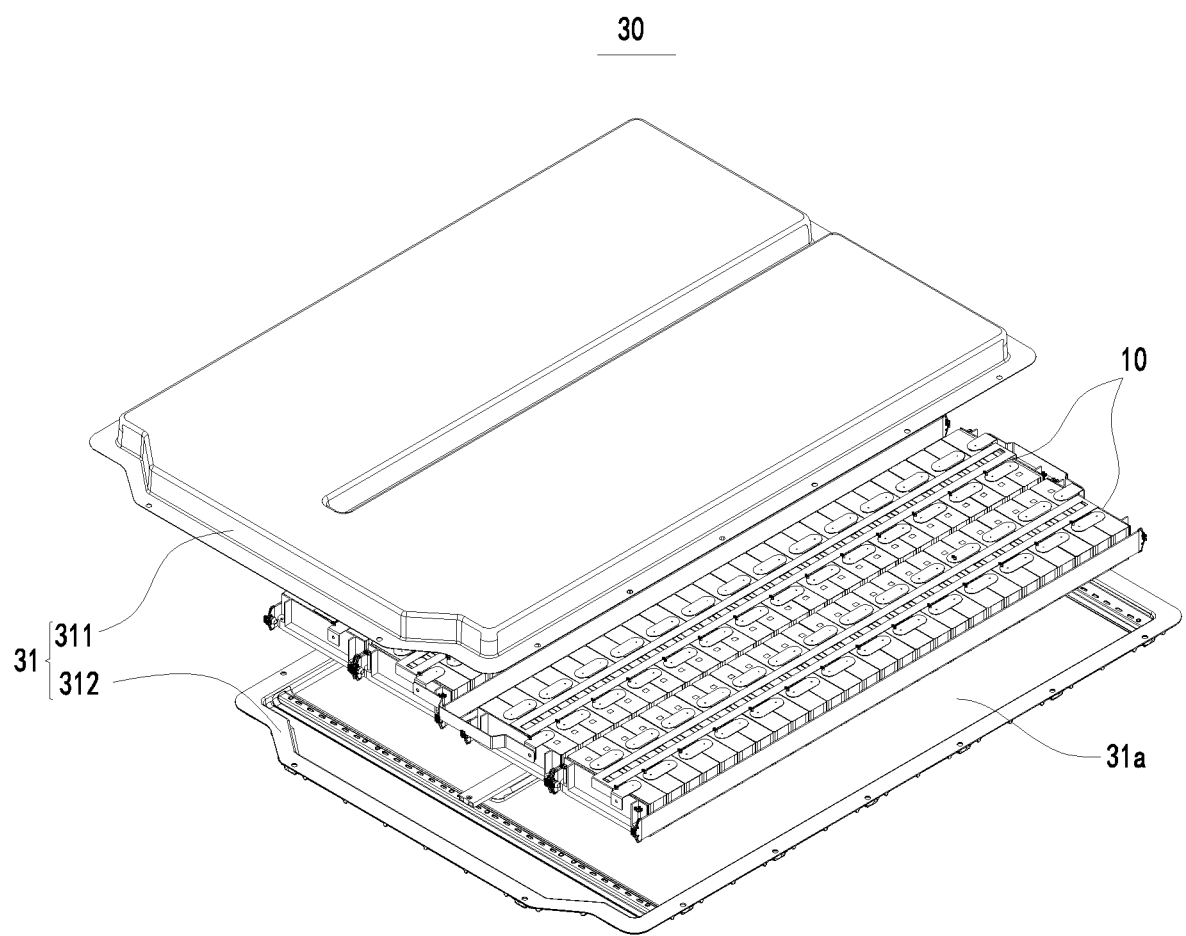
FIG. 6 is a schematic exploded diagram showing a configuration of a battery pack according to an embodiment of the present disclosure.
Figure 7:
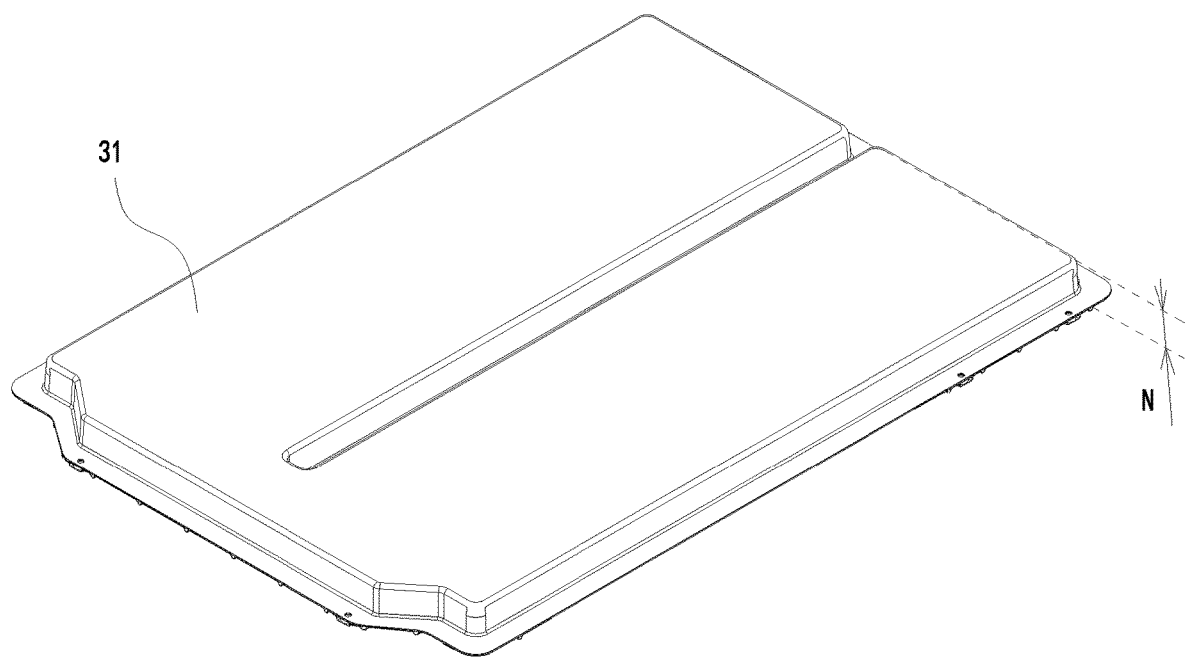
FIG. 7 is a schematic diagram showing a configuration of a battery pack according to a further embodiment of the present disclosure.

Referring to FIG. 6 and FIG. 7, an embodiment of the present disclose further provides a battery pack 30. The battery pack 30 can be applied to a vehicle such as an automobile. The automobile has a receiving housing for accommodating the battery pack 30, and the receiving housing is generally located at the bottom of the automobile. Since a chassis of the automobile is close to the ground and a height of the receiving housing determines a height space of the automobile, it is necessary to lengthen the receiving housing in a longitudinal direction or a width direction of the automobile, to reduce the height space of the automobile, which means lengths of the battery pack 30 and the battery module 10 are correspondingly lengthened, and the expansion force in the length direction will increase correspondingly. Therefore, it is required that the battery pack 30 not only can reduce an occupation space in the height direction of the automobile, but also can have an expansion force not too large in the length direction of itself. The height direction of the automobile is parallel to the second direction Y, and one of the longitudinal direction or the width direction of the automobile is the same as the first direction X.

The battery pack 30 of the present embodiment includes a housing 31 and the battery module 10 of the above embodiments disposed in the housing 31. There may be one battery module 10, or two or more battery modules 10.

The housing 31 of the present embodiment has a receiving chamber 31a for accommodating the battery module 10. In one embodiment, the housing 31 includes an upper cover 311 and a lower case 312, which can be sealingly connected to each other to seal the battery module 10 within the receiving chamber 31a. The battery module 10 accommodated in the receiving chamber 31a can be fixedly connected to the lower case 312.

In one embodiment, the housing 31 has a first height N greater than a second height H of the secondary battery 11 and less than twice of the second height H of the secondary battery 11, wherein the height of the housing 31 is in the same direction as the second direction Y. In this case, a gap is reserved between the housing 31 and the respective secondary batteries 11 of the battery module 10. When the electrode unit 14 expands too much and exerts a too large force to the cap assembly 15, the gap can provide a space for the cap assembly 15 so that the cap assembly 15 can be disconnected from the case 12, which can reduce a possibility of an explosion of the secondary battery 11 that expands too much while cannot be relieved.

In one embodiment, the battery pack 30 includes two to six battery modules 10 arranged in a width direction of the housing 31. Each of the battery modules 10 includes 20 to 32 secondary batteries 11. In the present embodiment, the width direction of the housing 31 is perpendicular to the first direction X and the second direction Y, and a length direction of the housing 31 is the same as the first direction X. Since the secondary battery 11 of the present embodiment has a small expansion amount in the first direction X, more secondary batteries 11 can be arranged side by side in the first direction X, thereby greatly increasing the energy density of the battery module 10.

In one embodiment, the secondary battery 11 has a thickness D (as shown in FIG. 2) of 50 mm or more, and a height H (as shown in FIG. 4) of 80 mm or more. The thickness of the secondary battery 11 has a same direction as the first direction X, and the height of the secondary battery 11 has a same direction as the second direction Y.

The battery pack 30 of the present embodiment includes a housing 31 and a battery module 10. When expanding, the battery module 10 has a small expansion amount in the length direction of the housing 31, and thus will release a small expansion force in the length direction, and exert a small force on the housing 31. As a result, in the first direction X, it is not necessary to use a structural member with high strength to restrain the battery module 10, which is advantageous for reducing a volume and weight of the structural member, thereby facilitating lightweight design of the battery pack 30 and improving the energy density of the battery pack 30. Meanwhile, it is not necessary for the housing 31 to have a high rigidity and strength in the first direction X, thereby lowering structural requirements on the housing 31.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, comprising:
two or more secondary batteries arranged side by side in a first direction, each of which includes a case, an electrode assembly and a closing portion, wherein the case has a receiving hole comprising an opening and extending in a second direction, and the first direction intersects with the second direction, wherein the closing portion is sealingly connected with the case to close the opening, the electrode assembly is disposed in the receiving hole and includes two or more electrode units, the electrode unit includes a first electrode plate, a second electrode plate and a separator, and the two or more electrode units are stacked in the second direction,
wherein the electrode unit includes a wide side and a narrow side, wherein the wide side is disposed opposite to the closing portion, the narrow side is located on one end of the wide side in the first direction, and the wide side has an area larger than that of the narrow side,
wherein the electrode unit is formed by winding the first electrode plate, the second electrode plate and the separator, and the electrode unit is formed into a flat shape and has two wide sides and two narrow sides, wherein the two narrow sides are connected to two opposite ends of the wide side in the first direction, respectively, and
wherein the first electrode plates in adjacent two layers have a first gap corresponding to the narrow side, and the first gap has a dimension of 5 μm to 50 μm.

2. The battery module of claim 1, wherein a ratio of the area of the narrow side to that of the wide side is in a range of 1/10~1/2.

3. The battery module of claim 1, wherein the first electrode plates in adjacent two layers have a second gap corresponding to the wide side, wherein the first gap has a dimension greater than that of the second gap.

4. The battery module of claim 1, wherein the case is made of a material of metal, and includes a first side wall, a second side wall and a bottom wall connected to the first side wall and the second side wall, wherein the first side wall has a larger area than the second side wall and the bottom wall, adjacent two secondary batteries are disposed with the first side walls opposite to each other, and the narrow side of the electrode unit is disposed corresponding to the first side wall.

5. The battery module of claim 4, wherein a third gap is provided between the narrow side and the first side wall, and the third gap has a dimension of 0.3 mm to 0.9 mm.

6. The battery module of claim 4, wherein the first side wall and the second side wall each has a thickness less than that of the bottom wall.

7. The battery module of claim 1, wherein the closing portion includes a cap plate and electrode terminals, all of which are located at one side of the electrode assembly in the second direction, wherein the cap plate is connected to the case, and the electrode terminals are disposed on the cap plate and electrically connected to the electrode assembly.

8. The battery module of claim 1, wherein the battery module further comprises a first end plate and a second end plate spaced apart from each other in the first direction, wherein the two or more secondary batteries are disposed between the first end plate and the second end plate, and the first end plate and the second end plate each has a Young's modulus less than 30 Gpa.

9. A battery pack, comprising:
a housing having a receiving chamber; and
the battery module according to claim 1, wherein the battery module is accommodated in the receiving chamber.

10. The battery pack of claim 9, wherein in the second direction, the housing has a height greater than a height of the secondary battery and less than twice of the height of the secondary battery.

11. The battery pack of claim 9, wherein the battery pack comprises two to six battery modules arranged in a width direction of the housing, and each of the battery modules comprises 20 to 32 secondary batteries.

12. The battery pack of claim 10, wherein the secondary battery has a thickness of 50 mm or more, and the secondary battery has a height of 80 mm or more.

13. The battery pack of claim 11, wherein the secondary battery has a thickness of 50 mm or more, and the secondary battery has a height of 80 mm or more.

14. The battery pack of claim 9, wherein the first electrode plates in adjacent two layers have a second gap corresponding to the wide side, wherein the first gap has a dimension greater than that of the second gap.

15. The battery pack of claim 9, wherein the case is made of a material of metal, and includes a first side wall, a second side wall and a bottom wall connected to the first side wall and the second side wall, wherein the first side wall has a larger area than the second side wall and the bottom wall, adjacent two secondary batteries are disposed with the first side walls opposite to each other, and the narrow side of the electrode unit is disposed corresponding to the first side wall.

* * * * *